United States Patent
West

(10) Patent No.: US 8,847,520 B2
(45) Date of Patent: Sep. 30, 2014

(54) THERMALLY SELF-STABILIZING LED MODULE

(76) Inventor: Stacey H. West, Upland, CA (US)

( * ) Notice: Subject to any disclaimer, the term of this patent is extended or adjusted under 35 U.S.C. 154(b) by 677 days.

(21) Appl. No.: 13/135,628

(22) Filed: Jul. 9, 2011

(65) Prior Publication Data

US 2012/0062150 A1 Mar. 15, 2012

Related U.S. Application Data

(63) Continuation of application No. 11/227,768, filed on Sep. 15, 2005, now Pat. No. 7,986,112.

(51) Int. Cl.
*G05F 1/00* (2006.01)

(52) U.S. Cl.
USPC ........ 315/309; 315/291; 315/247; 315/185 S; 315/224

(58) Field of Classification Search
USPC .......... 315/247, 224, 225, 209 R, 185 S, 291, 315/307–326
See application file for complete search history.

(56) References Cited

U.S. PATENT DOCUMENTS

| | | |
|---|---|---|
| 4,286,311 A | 8/1981 | Maglica |
| 4,656,565 A | 4/1987 | Maglica |
| 4,683,519 A | 7/1987 | Murakami |
| 4,851,974 A | 7/1989 | Maglica |
| 5,213,408 A | 5/1993 | Shiau |
| 5,459,649 A | 10/1995 | Ellion |
| 5,485,360 A | 1/1996 | Maglica |
| 5,549,481 A | 8/1996 | Morlion et al. |
| 5,598,068 A | 1/1997 | Shirai |
| 5,765,937 A | 6/1998 | Shiau |
| 5,783,909 A | 7/1998 | Hochstein |
| 5,801,490 A | 9/1998 | Fai |
| 5,865,529 A | 2/1999 | Yan |
| 5,975,714 A | 11/1999 | Vetorino et al. |
| 6,046,572 A | 4/2000 | Matthews et al. |
| 6,086,218 A | 7/2000 | Robertson |
| 6,127,784 A | 10/2000 | Grossman et al. |
| 6,153,985 A | 11/2000 | Grossman |
| 6,161,910 A | 12/2000 | Reisenauer et al. |

(Continued)

FOREIGN PATENT DOCUMENTS

| | | |
|---|---|---|
| CN | 2491693 Y | 5/2002 |
| CN | 1419797 A | 5/2003 |

(Continued)

OTHER PUBLICATIONS

Secondary Optics Design Considerations for Super Flux LEDs, Application Note 1149-5, Hewlett Packard, Sep. 1998.

(Continued)

*Primary Examiner* — Tuyet Thi Vo
(74) *Attorney, Agent, or Firm* — Maceiko IP

(57) ABSTRACT

An improved LED module that is thermally self-stabilizing, and that is able to be retrofitted into an existing flashlight is provided. In one embodiment, the LED module includes a light emitting diode, an amplifying circuit and a microchip. The amplifying circuit includes a temperature sensing device to sense heat from the light emitting diode. The output of the amplifying circuit is input to the microchip which output to a switching device that regulates energy that is delivered to the light emitting diode. The switching device may be part of a boosting circuit, a bucking circuit or an inverting circuit.

16 Claims, 9 Drawing Sheets

(56) References Cited

U.S. PATENT DOCUMENTS

| | | | |
|---|---|---|---|
| 6,168,288 B1 | 1/2001 | St. Claire | |
| 6,190,020 B1 | 2/2001 | Hartley | |
| 6,220,719 B1 | 4/2001 | Vetorino et al. | |
| 6,222,138 B1 | 4/2001 | Matthews et al. | |
| 6,249,089 B1 | 6/2001 | Bruwer | |
| 6,274,924 B1 | 8/2001 | Carey et al. | |
| 6,313,589 B1 * | 11/2001 | Kobayashi et al. | 315/309 |
| 6,328,456 B1 | 12/2001 | Mize | |
| 6,345,464 B1 | 2/2002 | Kim et al. | |
| 6,376,994 B1 | 4/2002 | Ochi et al. | |
| 6,400,101 B1 | 6/2002 | Biebl et al. | |
| 6,406,196 B1 | 6/2002 | Uno et al. | |
| 6,408,824 B1 | 6/2002 | Pacucci et al. | |
| 6,411,046 B1 | 6/2002 | Muthu | |
| 6,439,738 B1 | 8/2002 | Matthews et al. | |
| 6,517,215 B2 | 2/2003 | Mele | |
| 6,540,377 B1 | 4/2003 | Ota et al. | |
| 6,585,391 B1 | 7/2003 | Koch et al. | |
| 6,622,416 B2 | 9/2003 | Kim | |
| 6,693,394 B1 | 2/2004 | Guo et al. | |
| 6,722,772 B2 | 4/2004 | Maglica | |
| 6,791,283 B2 | 9/2004 | Bowman et al. | |
| 6,808,287 B2 | 10/2004 | Lebens et al. | |
| 6,827,468 B2 | 12/2004 | Galli | |
| 6,828,739 B2 | 12/2004 | Bruwer et al. | |
| 6,841,941 B2 | 1/2005 | Kim et al. | |
| 6,841,947 B2 | 1/2005 | Berg-johansen | |
| 6,854,865 B2 | 2/2005 | Probst et al. | |
| 6,966,677 B2 | 11/2005 | Galli | |
| 7,014,335 B2 | 3/2006 | Probst et al. | |
| 7,083,297 B2 | 8/2006 | Matthews et al. | |
| 7,091,874 B2 | 8/2006 | Smithson | |
| 7,114,831 B2 | 10/2006 | Popovich et al. | |
| 7,116,061 B2 | 10/2006 | Kim et al. | |
| 7,220,016 B2 | 5/2007 | Matthews et al. | |
| 7,293,893 B2 | 11/2007 | Kim | |
| 7,296,913 B2 | 11/2007 | Catalano et al. | |
| 7,393,120 B2 | 7/2008 | Kang et al. | |
| 7,543,961 B2 | 6/2009 | Arik et al. | |
| 7,549,765 B2 | 6/2009 | Kim et al. | |
| 7,726,844 B2 | 6/2010 | Chen | |
| 2001/0020546 A1 | 9/2001 | Eldridge et al. | |
| 2003/0025465 A1 * | 2/2003 | Swanson et al. | 315/291 |
| 2003/0035284 A1 | 2/2003 | Maglica | |
| 2003/0080691 A1 | 5/2003 | Yasuda et al. | |
| 2005/0012698 A1 | 1/2005 | Takahashi | |
| 2005/0024864 A1 | 2/2005 | Galli | |
| 2005/0057187 A1 | 3/2005 | Catalano | |
| 2005/0122711 A1 | 6/2005 | Matthews et al. | |
| 2005/0237005 A1 | 10/2005 | Maxik | |
| 2006/0039139 A1 | 2/2006 | Maglica et al. | |
| 2006/0132323 A1 | 6/2006 | Grady | |
| 2007/0086189 A1 | 4/2007 | Raos et al. | |
| 2007/0091581 A1 | 4/2007 | Gisin et al. | |
| 2007/0159833 A1 | 7/2007 | Netzel, Sr. et al. | |
| 2007/0274096 A1 | 11/2007 | Chew et al. | |
| 2008/0099770 A1 | 5/2008 | Mendendorp et al. | |
| 2008/0158887 A1 | 7/2008 | Zhu et al. | |
| 2008/0232119 A1 | 9/2008 | Ribarich | |
| 2013/0300297 A1 * | 11/2013 | Shteynberg et al. | 315/151 |

FOREIGN PATENT DOCUMENTS

| | | |
|---|---|---|
| EP | 1 501 070 A2 | 1/2005 |
| RU | 32744 U1 | 9/2003 |
| SU | 402095 | 2/1974 |
| WO | WO 93/24789 | 12/1993 |

OTHER PUBLICATIONS

Using Super Flex LEDs in Automotive Design Lamps, Application Note 1149-1, Hewlett Packard, 1999.

PCT International Search Report, PCT/US06/35764 (related to U.S. Appl. No. 11/227,768), Jul. 30, 2008.

PCT Written Opinion of the International Searching Authority, PCT/US06/35764 (related to U.S. Appl. No. 11/227,768), Jul. 30, 2008.

PCT International Preliminary Report on Patentability, PCT/US06/35764 (related to U.S. Appl. No. 11/227,768), Jul. 14, 2010.

PCT International Search Report, PCT/US2009/053219 (related to U.S. Appl. No. 12/188,201), Nov. 30, 2009.

PCT Written Opinion of the International Searching Authority, PCT/US2009/ 053219 (related to U.S. Appl. No. 12/188,201), Nov. 30, 2009.

PCT International Preliminary Report on Patentability, PCT/US2009/ 053219 (related to U.S. Appl. No. 12/188,201), Jan. 21, 2011.

PCT Written Opinion of the International Preliminary Examining Authority, PCT/US09/53219 (related to U.S. Appl. No. 12/188,201), Nov. 8, 2010.

PCT International Search Report, PCT/US05/28560 (related to U.S. Appl. No. 10/922,714), Oct. 4, 2007.

PCT Written Opinion of the International Searching Authority, PCT/US05/ 28560 (related to U.S. Appl. No. 10/922,714), Oct. 4, 2007.

* cited by examiner

US 8,847,520 B2

THERMALLY SELF-STABILIZING LED MODULE

CROSS REFERENCE TO RELATED APPLICATION

The application filed herewith is a continuation application of U.S. patent application Ser. No. 11/227,768, filed on Sep. 15, 2005 now U.S. Pat. No. 7,986,112, entitled Improved LED Module.

BACKGROUND OF THE INVENTION

1. Field of the Invention

The field of the present invention relates to a lighting module including a light emitting diode (LED), and pertains particularly to an energy regulating, thermally stable LED based module for use in hand held portable lighting devices, such as flashlights.

2. Background

LEDs have been used in various applications including illuminating watches, transmitting information from remote controls, and forming images on jumbo television screens. More recently, LEDs have been used in portable lighting devices (such as flashlights), because, among other things, LEDs can last longer, produce light more efficiently, and can be more durable than incandescent lamps commonly used in conventional flashlights. Moreover, because flashlights that use incandescent lamps dominate the field, LED modules (a module that uses an LED as its light source) have been designed that can be retrofitted into existing flashlights.

A problem with simply replacing an incandescent lamp of an existing flashlight with an LED module, without more, is that it fails to operate the LED at its potential lighting capacity under a thermally stable condition.

It is known that LEDs produce more light with increased forward current. In situations where available voltage is abundant, the LED may be driven close to its maximum forward current value to produce more light. However, where the available voltage is limited or depletes over time, such as in the case of a battery powered flashlight, delivering a forward current close to the LED's maximum value may not be possible. A similar concern exists if the battery or batteries contained in an existing flashlight provides too much voltage, thereby delivering a forward current above the LED's maximum value, which will result in damage to the LED.

Another problem with simply replacing an incandescent lamp of an existing flashlight with an LED module is that it fails to address the thermal consequences associated with LEDs. Although LEDs produce light more efficiently than their incandescent counterparts, LEDs generate significantly more heat. Therefore, effective dissipation of heat is needed to maintain the LED temperature within its design limits. One effective way of dissipating heat generated by a light source in a flashlight is disclosed in a co-pending application Ser. No. 10/922,714 entitled Improved LED Flashlight, filed Aug. 20, 2004, which is hereby incorporated by reference.

However, in the case of an LED module that is designed for retrofit, the existing flashlight into which the LED module is used may not be able to sufficiently dissipate the increased heat that is produced by the LED. Most LEDs have projected life and lumen capacity that is conditioned on maintaining a prescribed LED operating temperature. If this temperature is not maintained, the life and/or the strength of the light generated by the LED diminishes. Accordingly, if the existing flashlight into which the LED module is retrofitted is insufficient in this regard, the LED module itself must self-control the amount of heat that the LED generates to ensure that the LED or the electronics that may control the LED are not damaged.

Existing LED modules have attempted to address the thermal dissipation problem by limiting the current delivered to the LED to a continuous value at a safe level much below its potential light emitting capacity. However, such an approach makes inefficient use of the LED's lighting capacity and the LED's full lighting potential is never achieved.

SUMMARY OF THE INVENTION

The present invention involves a lighting module that is energy regulating and thermally self-stabilizing, and that is able to be retrofitted into an existing flashlight.

In one embodiment, the lighting module includes an LED, an amplifying circuit and a microchip. The amplifying circuit has a thermistor arranged to sense heat from the LED. The microchip is coupled to the amplifying circuit and a switching device to regulate the energy that is delivered to the LED. The switching device may be part of a boosting circuit, a bucking circuit or an inverting circuit.

In a second embodiment, the lighting module includes a conductive housing, an LED, and a circuit board. The circuit board includes a module circuit that is electrically coupled to the LED. The circuit is at least partially contained within the cavity of the housing and also has a thermistor to sense heat from the LED. The thermistor may be coupled to an amplifying circuit. The gain of the amplifying circuit may adjust according to the temperature senses by the thermistor. The output of the amplifying circuit may also be the input to a microchip.

In another embodiment, the module can have a module circuit that is configured to regulate energy that is delivered to the LED based on the sensed temperature of the LED. In yet another embodiment, the LED module can have a module circuit that includes an energy regulating circuit and a thermal sensitive amplifying circuit.

DETAILED DESCRIPTION OF PREFERRED EMBODIMENTS

Figure 1A:
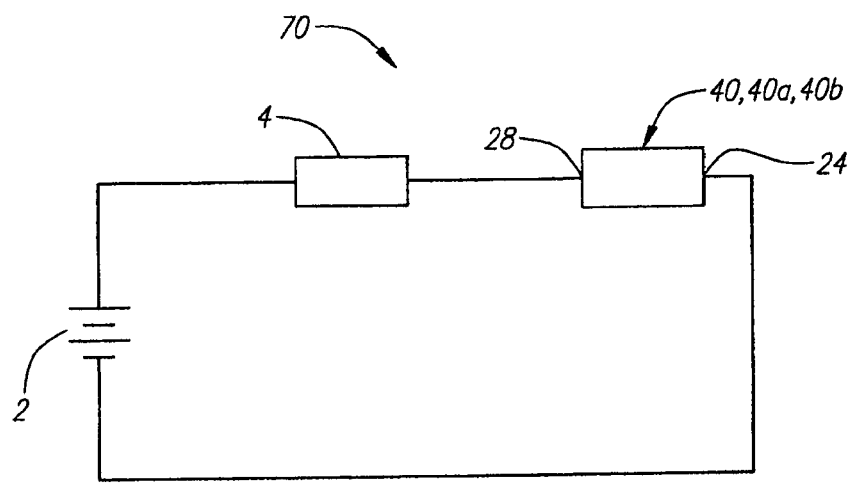
FIG. 1A is a circuit diagram of one embodiment of a main circuit of an electronic device.

Turning now to the drawings, as shown in FIG. 1A, a schematic depiction of one embodiment of a main circuit 70 of an electronic device includes a power source 2, a main switch 4, and an LED module 40. Energy from the power source 2 preferably drives the LED module 40, and the main switch 4 controls the energy that is delivered to the LED module 40. In one embodiment of the present invention, the main switch 4 simply allows or disrupts the available energy from the power source 2 to reach the LED module 40.

Figure 1B:
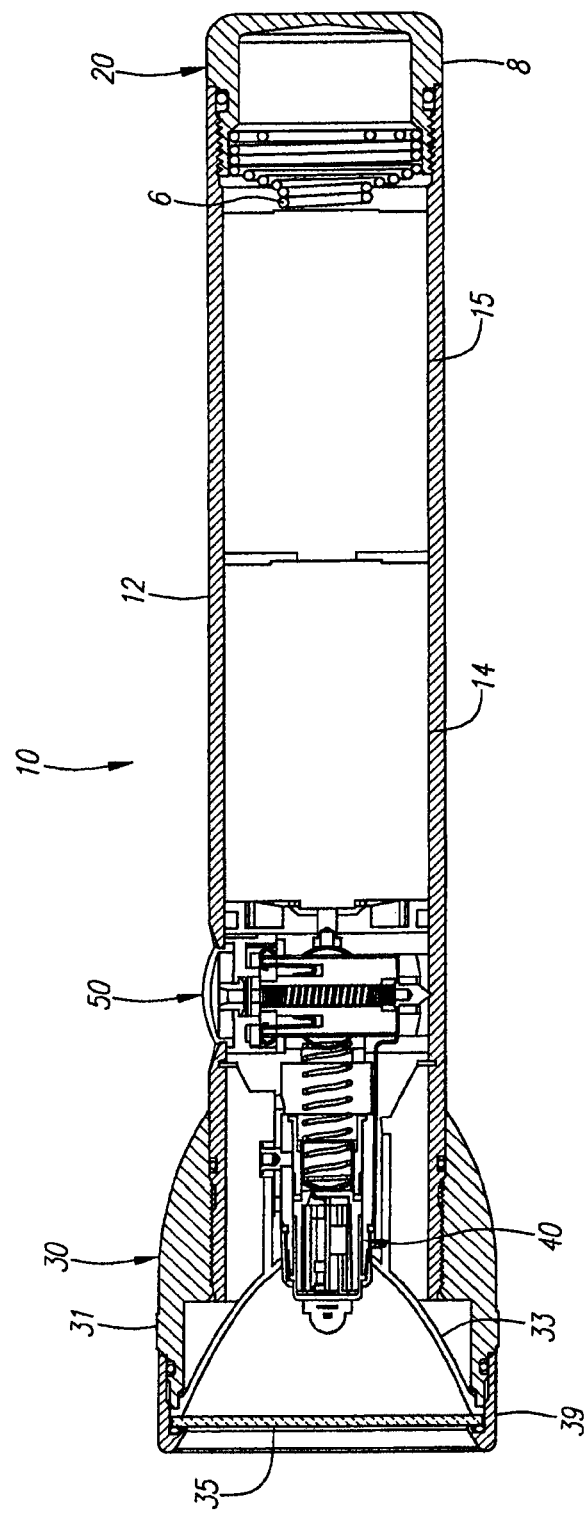
FIG. 1B is a sectional view of a flashlight embodying the main circuit of FIG. 1A.

Referring to FIG. 1B, the main circuit 70 is shown in one embodiment of a flashlight 10. The flashlight 10 includes a barrel 12, a tailcap assembly 20, a head assembly 30, the LED module 40, and a main switch assembly 50. In the embodiment illustrated, the barrel 12 encases two batteries 14, 15. The head assembly 30 and the LED module 40 are preferably disposed about the forward end of the barrel 12; the tailcap assembly 20 is preferably disposed to enclose the aft end of the barrel 12; and the main switch assembly 50 is preferably interposed between the LED module 40 and batteries 14, 15.

In the illustrated embodiment, the batteries 14, 15 serve as the power source 2 of the main circuit 70. In a preferred embodiment, the batteries 14, 15 are alkaline type dry cell batteries. However, other suitable portable sources of energy may be used including rechargeable type batteries, such as Lithium-Ion, Nickel Metal Hydride or Nickel-Cadmium cells.

The barrel 12 preferably has a length suitable to contain a desired number of batteries. In the illustrated embodiment, the barrel 12 has a length suitable for containing two batteries 14, 15. However, barrels having various lengths are contemplated herein to receive one or more batteries.

Figure 2:
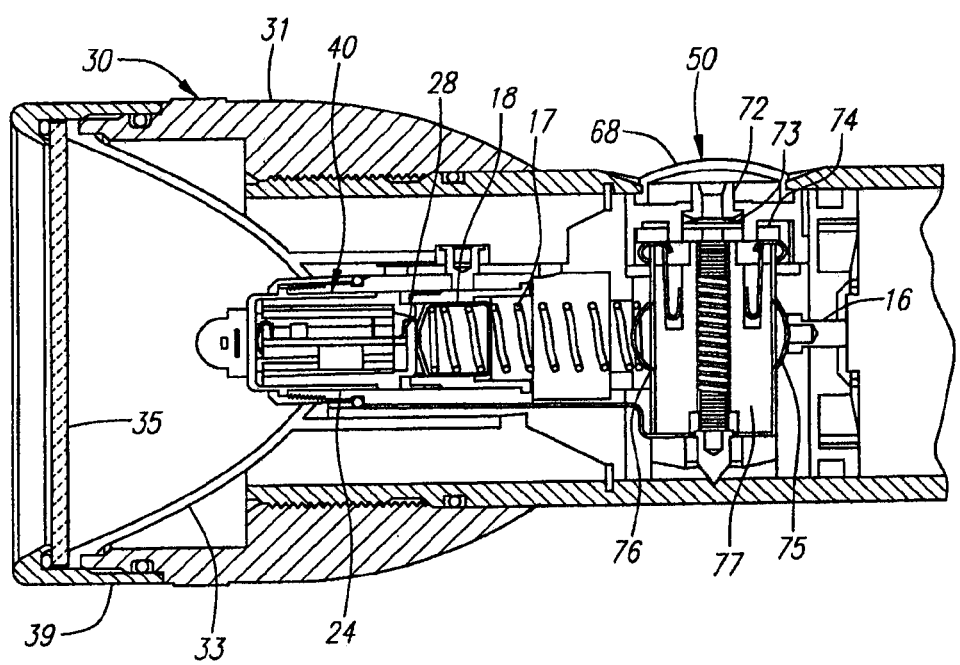
FIG. 2 is an enlarged sectional view of the forward section of the flashlight of FIG. 1B.

In the illustrated embodiment, the main switch assembly 50 serves as the main switch 4 of the main circuit 70. Referring to FIG. 2, energy from the batteries 14, to the main switch assembly 50 preferably flows through a contact button 16 that is interposed between the forwardmost battery 14 and the main switch assembly 50.

The main switch assembly 50 preferably includes a user interface 68, a plunger 72, a snap dome 73, a main switch circuit board 74, a main switch battery contact 75, a main switch module contact 76, and a switch housing 77. In the illustrated embodiment, the center electrode of the forwardmost battery 14 is electrically coupled to the main switch battery contact 75 through the contact button 16; the main switch battery contact 75 is electrically coupled to the main switch circuit board 74; and the main switch circuit board 74 is electrically coupled to the main switch module contact 76.

The main switch assembly 50 is preferably a momentary switch. When the user interface 68 is depressed, the plunger 72 pushes the snap dome 73 into contact with a select portion of the main switch circuit board 74. This momentary contact is received as a signal to the switch circuit board 74 which in turn passes or disrupts the energy flow from the batteries 14, 15 to the main switch module contact 76. In this way, the main switch assembly 50 can turn the flashlight 10 on or off. The main switch circuit board 74 may additionally include circuitry suitable for providing functions to the flashlight 10, such as for example, flashing, dimming or strobing by affecting the current that is delivered to a light source or, in the illustrated embodiment, the LED module 40. Other functions may include an electronic game, a global positioning transponder, a digital compass, or other commercially desirable functions.

Still referring to the illustrated embodiment of FIG. 2, the main switch battery contact 75 and module contact 76 are configured to include curved springs or biasing elements that bear against the contact button 16 and spring 17, respectively. By arranging the curved spring portion of the main switch battery contact 75 and module contact 76 against the switch housing 77 such that the spring forces generated by the contacts 75, 76 are transferred to the switch housing 77, the main switch circuit board 74 is advantageously protected from, for example, batteries 14, 15 shifting and pressing on the main switch assembly 50. In this way, an effective electrical connection can be maintained by the biasing elements while protecting sensitive components, such as the main switch circuit board 74.

Although the main switch assembly 50 as described above provides a configuration for turning the flashlight 10 on and off, other suitable switches are available for serving this function, such as a simple mechanical switch. However, the main switch assembly 50 as disclosed herein advantageously provides a flexible configuration for adding, revising or deleting functions from the flashlight 10. Also, the main switch assembly 50 as described avoids high oxidation problem between contacts often experienced with mechanical switches.

Still referring to FIG. 2, the current flowing from the main switch assembly 50 to the LED module 40 is preferably achieved through the spring 17 and a receptacle 18, (which is disposed about the forward end of the spring 17,) that are electrically connected to the main switch module contact 76 on one end and to the LED module 40 on the other end. The spring 17 urges the receptacle 18 toward the positive contact of the LED module 40. In the illustrated embodiment, the current flows into the LED module 40 at its positive contact 28, and flows out of the LED module 40 at its outer housing 24. The electrical energy then preferably passes through conductive means to the barrel 12, through the tailcap assembly 20; and returns to the negative end of the aftmost battery 15. In this way, the main circuit 70 of the flashlight 10 is completed.

The barrel 12 is preferably made from a conductive material, preferably aluminum, so that it may serve as part of the current path of the main circuit 70 between the LED module 40 and the power source 2, i.e., batteries 14, 15. However, the barrel 12 may alternatively be made of non-conductive material, such as plastic or rubber, and may include a current path by having a conductive sleeve within a non-conductive barrel to serve as part of the current path. Such a sleeve is described in U.S. Pat. Nos. 4,656,565 and 4,851,974 to Anthony Maglica, which is hereby incorporated by reference. In an alternate embodiment, a conductive strip within the barrel can serve as part of the current path. Such a strip is shown in U.S. Pat. No. 6,585,391.

Referring to FIG. 1B, the tailcap assembly 20 preferably includes a cap spring 6 and a cap 8. The tail cap assembly 20 may be part of the current path between the LED module 40 and the power source 2, and may receive the current passing through the barrel 12. In one embodiment, the electrical path from the barrel 12 may be to the cap 8; to the cap spring 6, and then to the negative contact of the aftmost battery 15. Alternatively, the electrical path may bypass the cap 8 and flow directly from the barrel 12 to the battery 15 through the cap spring 6. Another embodiment may provide an electrical path that bypasses the tailcap assembly 20 altogether and electrically connect the barrel 12 to the battery. A tailcap assembly 20 having a cap spring 6 provides an effective configuration for maintaining a spring assisted electrical connection between the components contained in the flashlight 10.

As shown in FIG. 1B and FIG. 2, the head assembly 30 includes a head 31, a reflector 33, a lens 35 and a cap 39. The reflector 33 and lens 35 are interposed between the head 31 and the cap 39 as illustrated in FIG. 2. The reflector 33 preferably includes a reflective parabolic surface to reflect the light emanating from the LED module 40. The head assembly 30 may be secured to the barrel 12 by thread engagement.

Figure 3:
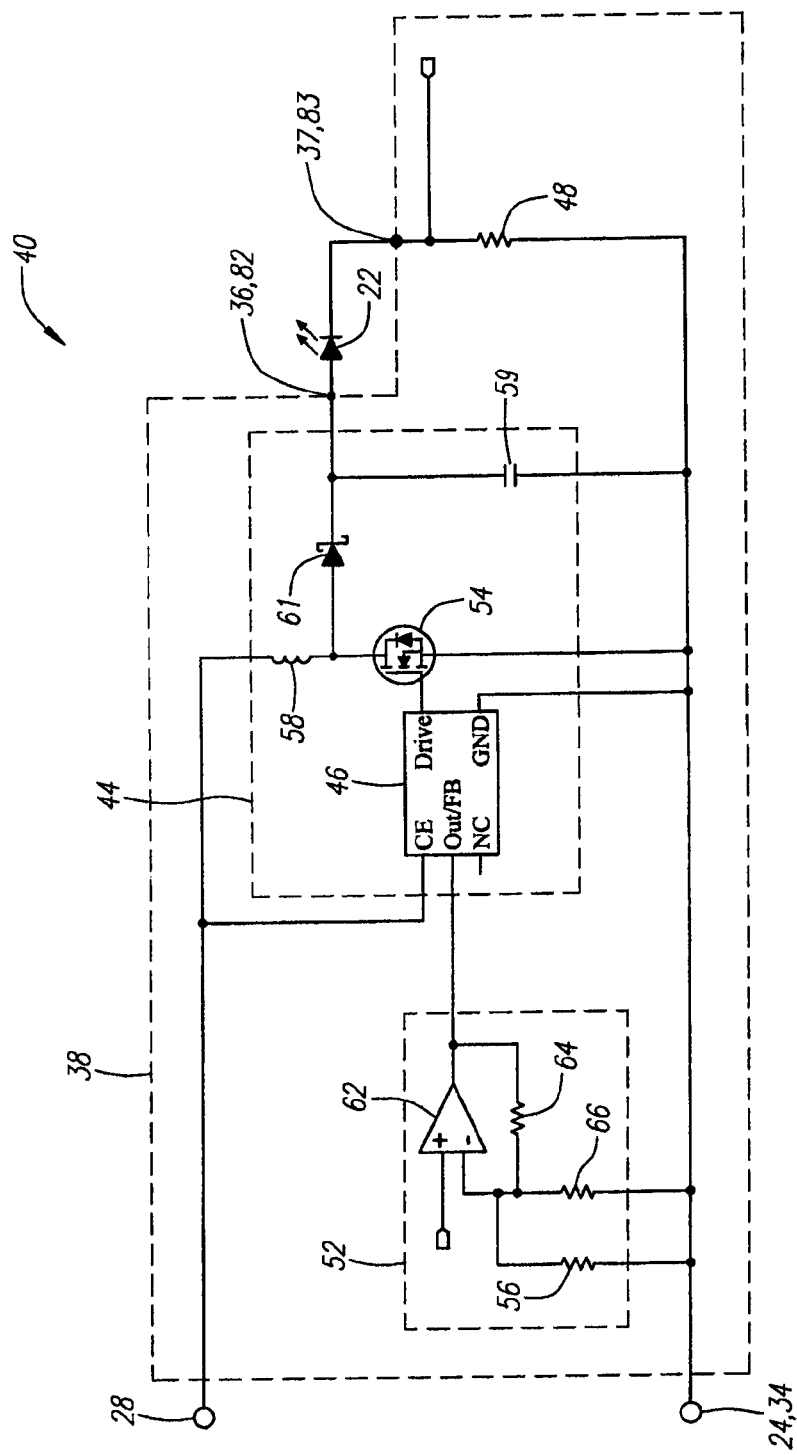
FIG. 3 is a circuit diagram of one embodiment of a module circuit.

As already mentioned, and schematically depicted in FIG. 1A, the current from the power source 2 flows into the LED module 40 at its positive contact 28 and flows out of the LED module 40 from its outer housing 24. Referring to FIG. 3, a schematic depiction of one embodiment of the LED module 40 according to the present invention generally includes an LED lamp 22 and a module circuit 38.

Referring to FIGS. 3, 4A, 4B and 4C, the LED lamp 22 is preferably commercially available and includes an LED and LED leads 82, 83 to which the module circuit 38 connects. Typically, LED's are rated according to permissible operating conditions. For example, an LED may be limited to a maximum forward current rating of 1000 mA, and a maximum LED junction temperature of 135° C.

An objective of the present invention is to have the LED lamp 22 produce as much light as possible, for as long as possible, without damaging the LED lamp 22 or the electronics that make up the LED module 40. This objective is achieved by regulating the current that flows to the LED lamp 22 and monitoring the heat that is generated from the LED lamp 22. In a preferred embodiment, a temperature sensing device is disposed within the LED module 40 to monitor the conditions surrounding the LED. When an undesirable increase in temperature is sensed, the current delivered to the LED lamp 22 may be decreased to protect the LED and the electronics from heat damage. When an undesirable decrease in temperature is sensed, the current delivered to the LED lamp 22 may be increased to cause the LED lamp 22 to produce more light.

Referring to FIG. 3, a first embodiment of the module circuit 38 preferably includes a controlled voltage boosting circuit 44, a thermal sensitive amplifying circuit 52, and a sense resistor 48. The voltage boosting circuit 44 is controlled because it includes feedback to adjust its output. The boosting circuit 44 is useful in situations where the power source 2 driving the LED module 40 has a maximum potential that is below what is needed to deliver the desired forward current. For example, in a case where flashlight 10 includes two alkaline type dry cell batteries arranged in series, it is generally known that the two batteries will have an operating range of 1.8 Volts to 3.0 Volts. But 3.5 Volts may be needed to deliver a forward current that is closer to the LED's maximum forward current rating. In such a situation, the boosting circuit 44 steps up the available voltage to approximately 3.5 Volts so that the desired forward current may be delivered to the LED lamp 22. The boosting circuit 44 also serves to maintain the desired forward current as the voltage level of the batteries diminish over time.

In a preferred embodiment, the boosting circuit 44 is a switching regulator. Referring to FIG. 3, the boosting circuit 44 includes a microchip 46, a switching MOSFET 54, an inductor 58, a capacitor 59, and a diode 61. The microchip 46 controls the switching duty cycle of the switching MOSFET 54. As illustrated, the switching MOSFET 54, inductor 58, the capacitor 59, and the diode 61 are arranged in a manner commonly known to those skilled in the art to form a boost converter. The microchip 46 receives feedback by way of the thermal sensitive amplifying circuit 52. When the feedback is outside a specified regulation range, the microchip adjusts the MOSFET's duty cycle until the regulation range is met.

The boosting circuit 44 described herein may be composed of other suitable circuitry or devices that step up the input voltage. For example, instead of having the inductor 58 as the energy-storage element of the boosting circuit 44, other suitable energy storage elements, such as a capacitor or a transformer, may also be used. Also, other suitable switching devices, such as a transistor, may be used instead of the switching MOSFET 54.

Still referring to FIG. 3, an electrical path connects the output of the boosting circuit 44 to the first LED reception contact 36; and the first LED reception contact 36 is coupled to the first LED lead 82. The current flows out of the LED lamp 22 through the second LED lead 83, which is coupled to the second LED reception contact 37. The main power path is through the sense resistor 48 and to ground contact 34. The sense resistor 48 is used to measure the current that is passing through the LED lamp 22, and the voltage measured across the sense resistor 48 serves as feedback to the microchip 46. Preferably, the sense resistor 48 is very small to minimize power waste. In a preferred embodiment, the sense resistor 48 has a value of 0.10 ohms.

Because the sense resistor 48 is very small, the voltage that forms across the sense resistor 48 is also very small. Therefore, before the sense resistor voltage is fed back to the microchip 46, it is amplified by the amplifier circuit 52.

The thermal stabilizing aspect of the present invention is implemented in the thermal sensitive amplifying circuit 52. Still referring to FIG. 3, the amplifying circuit 52 includes an operational amplifier 62, a first resistor 64, a second resistor 66, and a thermistor 56. The thermistor 56 is arranged in parallel with the second resistor 66. As configured, it is understood by those skilled in the art that the first resistor 64, the second resistor 66 and the thermistor 56, in combination, define the gain of the amplifying circuit 52. The thermistor 56 is a temperature responsive resistor that changes its resistance according to the sensed temperature. Therefore, as the sensed LED lamp 22 temperature varies, the gain of the amplifying circuit 52 varies.

In a preferred embodiment, the thermistor 56 has a negative resistance/temperature coefficient. Accordingly, when the temperature of the LED module 40 increases, the thermistor resistance decreases, and the gain of the amplifier circuit 52 increases. With the microchip feedback above the regulation range, the microchip 46 decreases the duty cycle of the switching MOSFET 54 and reduces the current that is delivered to the LED lamp 22. In this way, the temperature effects of the LED lamp 22 can be monitored and prevented from damaging the LED or the controlling electronics. In a preferred embodiment, the microchip 46 is configured to regulate the current delivered to the LED lamp 22 to approximately between 875 mA and 930 mA at a thermistor sensed temperature of between 20° C. to 30° C.; between 880 mA and 910 mA at between 23° C. to 27° C.; and substantially 900 mA at 25° C.

At a higher temperature, the microchip 46 is preferably configured to regulate the current delivered to the LED lamp 22 to approximately between 330 mA and 450 mA at a thermistor sensed temperature of between 80° C. to 100° C.; 330 mA to 370 mA at 90° C. to 100° C.; and substantially 330 mA at 100° C.

Although these temperature/current ranges have been found to effectively present an LED from heat damage, the current invention should not be viewed to be limited to any specific temperature/current range. Rather, the instant invention is directed to an LED module that operates the LED at is potential, and that is thermally self-stabilizing.

Although a thermistor having a negative resistance/temperature coefficient is disclosed herein, a thermistor having a positive resistance/temperature coefficient may also be used. Moreover, other suitable temperature sensing devices, such as a voltage output temperature sensor, may be used instead of a thermistor.

Further, a suitable microchip 46 for this application may be a processor, a microprocessor, a controller, an integrated circuit, an ASIC, or other devices known to those skilled in the art.

In this way, the LED module 40 allows the initial operation of the flashlight to be at a high power output, and to deliver more light, while protecting the electronics from heat damage. Without the thermal stabilizing capability as described and illustrated above, driving the LED lamp 22 at 750 mA may result in heat damage to the LED. Operating the LED lamp 22 at lower current will result in less light.

Figure 4A:
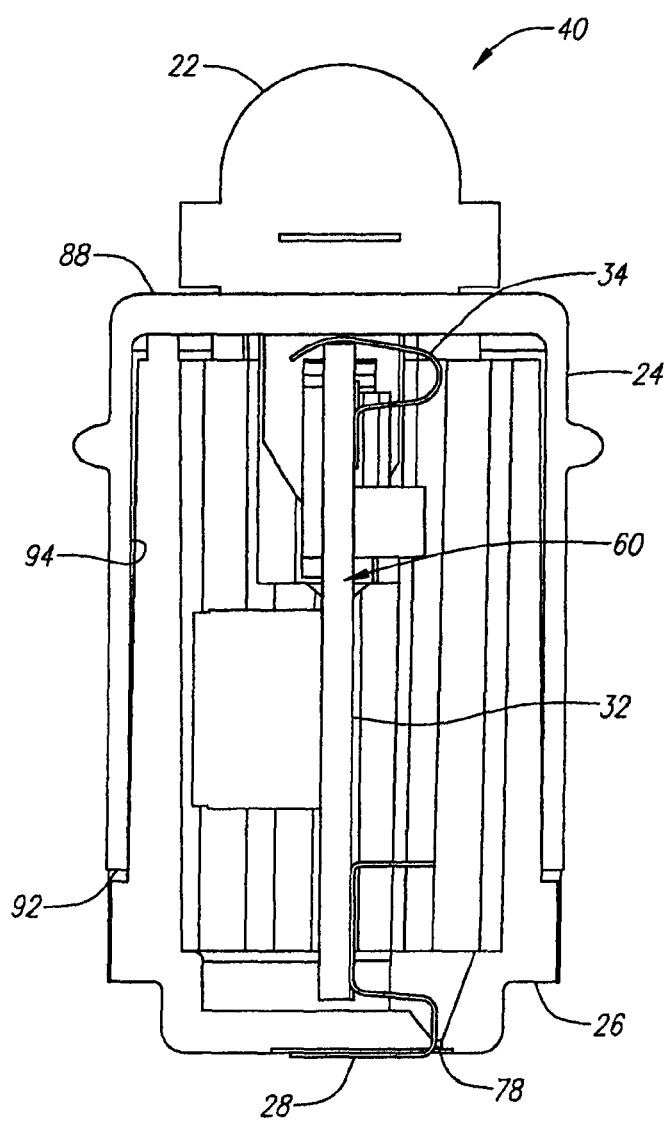
FIG. 4A is a sectional view of an LED module implementing the module circuit of FIG. 3.
Figure 4B:
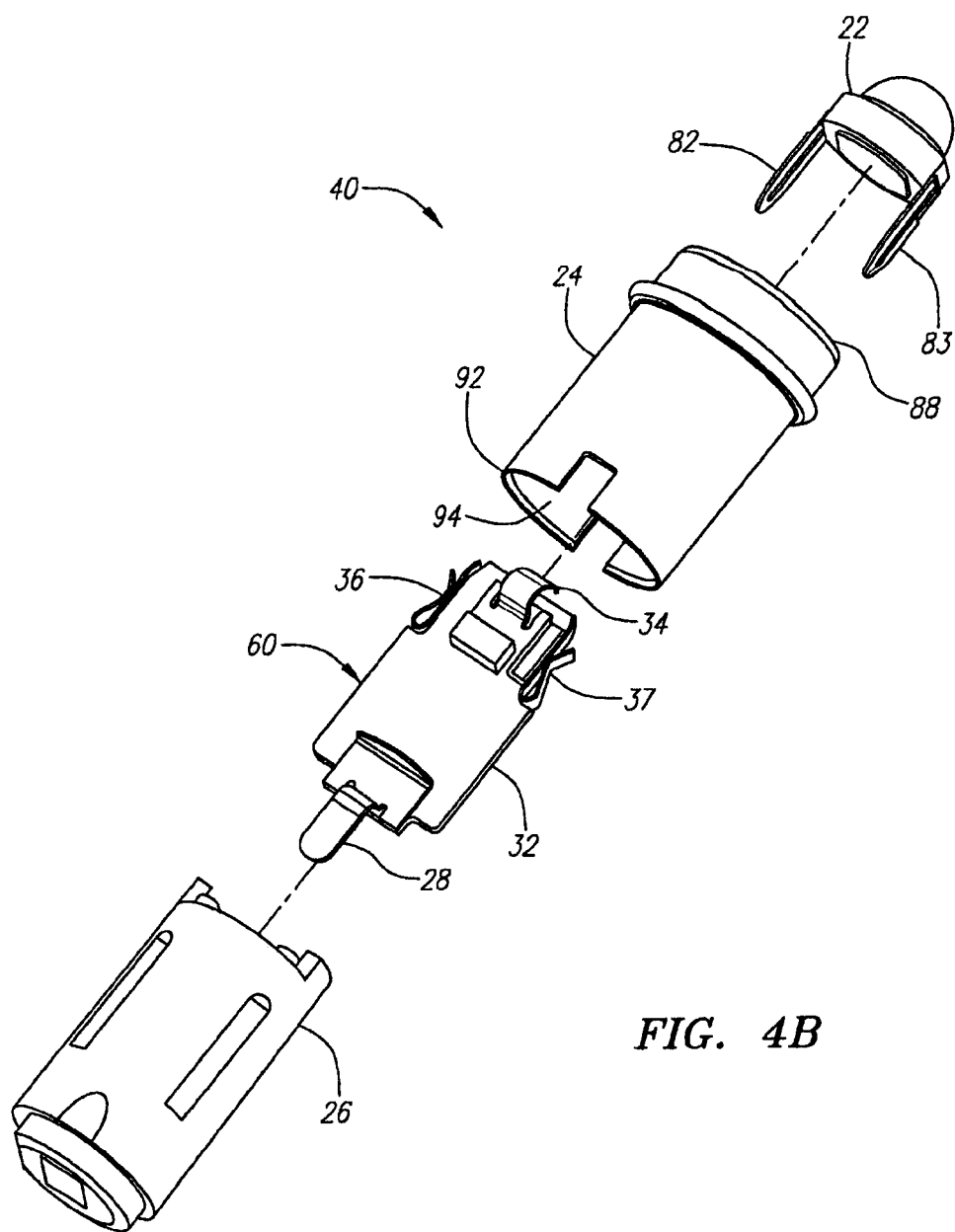
FIG. 4B is an exploded view of an LED module implementing the module circuit of FIG. 3.
Figure 4C:
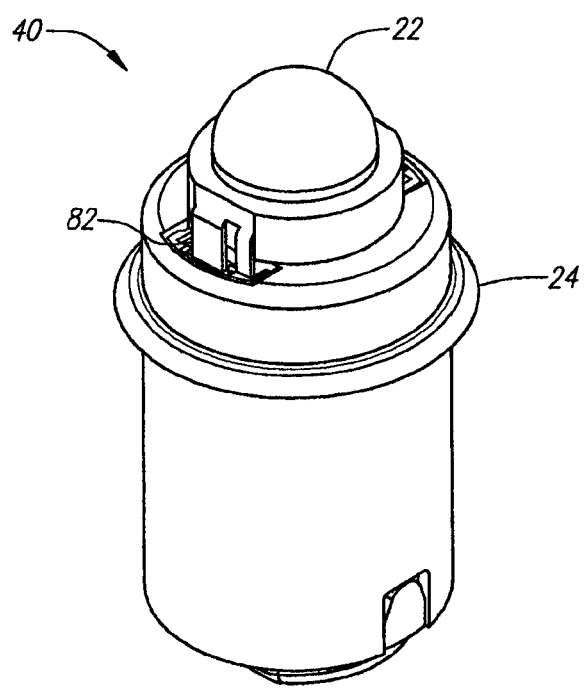
FIG. 4C is a perspective view of an LED module implementing the module circuit of FIG. 3.

Having now described the schematic depiction of one embodiment of the LED module 40, a preferred physical implementation of the LED module 40 is illustrated in FIGS. 4A, 4B, and 4C. The LED module 40 includes the LED lamp 22, the outer housing 24, a circuit assembly 60, and a holder 26. The circuit assembly 60 is preferably held in the holder 26; the holder 26 is preferably arranged within the outer housing 24; and the LED lamp 22 is preferably disposed on the forward end of the holder 26.

Preferably, the outer housing 24 is made from a conductive material. In the illustrated embodiment, the outer housing 24 is generally a receptacle including a first end 88, a second end 92 and a cavity 94. The cavity 94 may include features, such as slots, to receive and align holder 26 therein.

In a preferred embodiment, the circuit assembly 60 includes a circuit board 32, the positive contact 28, a negative contact 34, and first and second LED reception contacts 36, 37. Preferably, the components of the module circuit 38, including the thermistor 56, are mounted to the circuit board 32 with necessary traces printed thereon. The circuit assembly 60 is configured to be held in the holder 26. Referring to FIG. 4A, the positive contact 28 of the circuit assembly 60 preferably extends through an opening 78 on the aft end of the holder 26. The positive contact 28 is preferably folded over to bear against the aft end of the holder 26 for support. The negative contact 34 of the circuit assembly 60 is preferably disposed about the forward end of the circuit board 32 and arranged to electrically connect to the outer housing 24. Arranged this way, the circuit components mounted on the circuit board 32 is advantageously protected from mechanical forces, such as from the spring 17 and receptacle 18.

Referring to FIGS. 4B and 4C, LED leads 82, 83 extend through openings about the first end 88 of the outer housing 24, and electrically couple to the first and second LED reception contacts 36, 37 of the circuit assembly 60. Preferably, the electrical connection between the LED reception contacts 36, 37 and the LED lead 82, 83 are mechanical, or particularly, by friction, to ease manufacturing and production costs. However, any suitable electrical connection methods, such as soldering, can be used.

Arranged as described, the components of the module circuit 38 are mounted to the circuit board 32 and contained in the LED module 40. The physical arrangement of the LED module 40 as just described is one suitable way to implement the module circuit 38 and operate the LED lamp at its lighting potential while protecting the electronics from heat damage by monitoring the heat generated from the LED and decreasing the current flowing thereto if necessary. The external dimensions of the LED module 40, and particularly the outer housing 24, is preferably consistent with PR type light bulbs. Having such an external dimension facilitates retrofitting the LED module 40 as described herein into existing flashlights that receive incandescent PR type light bulbs. However, the present invention as described herein is not limited by the external dimension or features as illustrated. The benefits and advantages of an LED module that operates the LED at its potential, that is thermally self-stabilizing, and that is able to be retrofitted into an existing flashlight may be achieved through numerous external configurations.

The flow of energy through the flashlight 10, and particularly through the LED module 40, will now be described. Electrical current from the batteries 14, 15 flows through the main switch assembly 50 and into the LED module at the positive contact 28. The positive contact 28 is electrically connected to the module circuit 38 mounted on the circuit board 32 and the main power flows to the boosting circuit 44. The output of the boosting circuit 44 flows to the first LED reception contact 36, then to the LED lead 82 and through the LED. The electrical current flows out of the LED lamp 22 through the second LED lead 83, which is coupled to the second LED reception contact 37. The main power passes through the sense resistor 48 and to the negative contact 34 of the circuit assembly 60, while the sense resistor 48 voltage is directed to the thermal sensitive amplifying circuit 52.

The main power then passes through the sense resistor and to the negative contact 34 which is coupled to the outer housing 24. The outer housing 24 is coupled to the barrel 12, the tailcap assembly 20, and finally to the negative end of the aftmost battery 15 to complete the main circuit.

The sense resistor 48 voltage is amplified by the thermal sensitive amplifying circuit 52 according to a gain that is a function of the LED lamp 22 temperature. The output of the thermal sensitive amplifying circuit 52 is feedback to the microchip 46 which regulates the current that is delivered to the LED lamp 22 by adjusting the duty cycle of the switching MOSFET 54.

Figure 5:
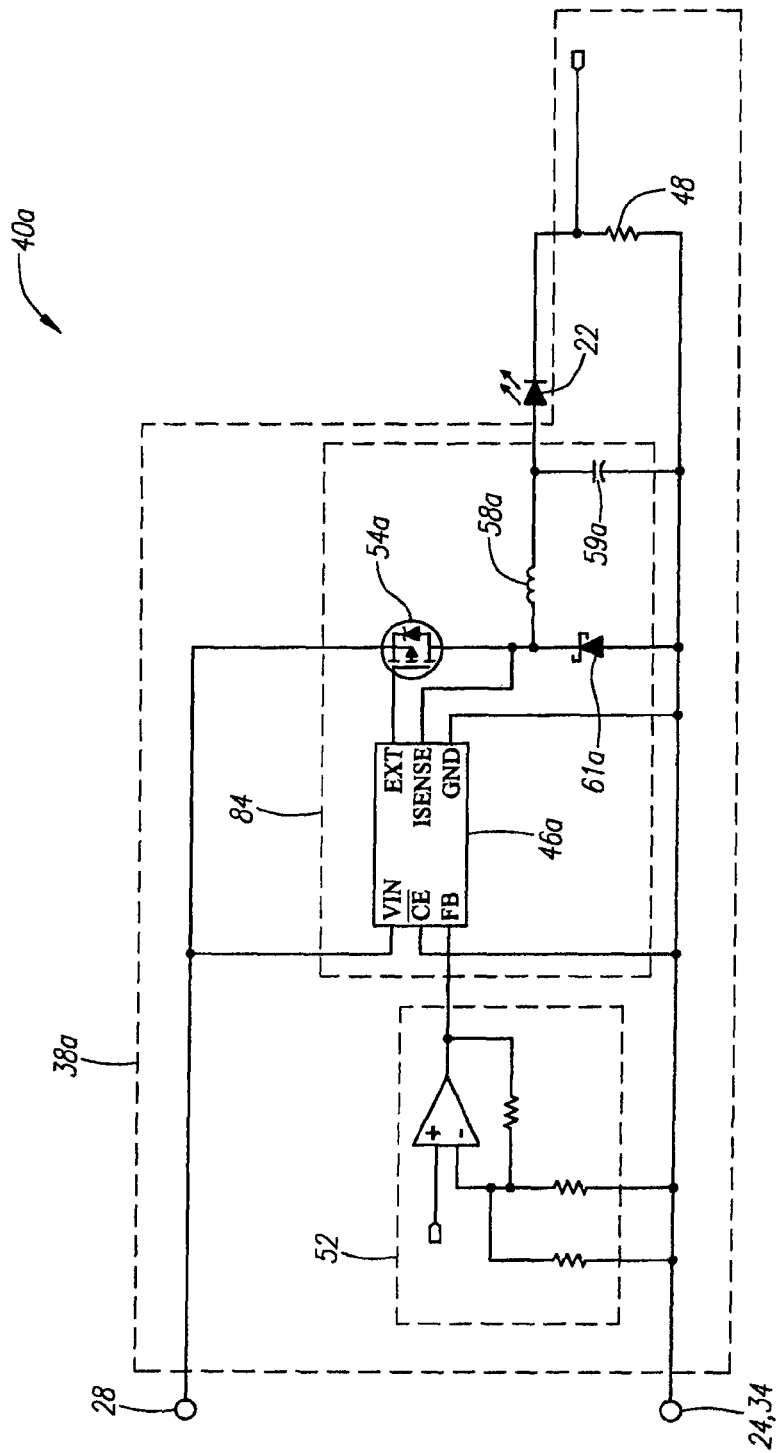
FIG. 5 is a circuit diagram of a second embodiment of a module circuit.

In a second embodiment of an LED module 40a, the power source 2 coupled to the LED module 40a may have a potential that is above what is needed to deliver the desired forward current. For example, in the instance where a flashlight includes four batteries arranged in series, it would have an operating range of 3.6 Volts to 6.0 Volts. In such an instance, the module circuit 38a preferably includes a controlled voltage bucking circuit 84 in place of a boosting circuit 44. Referring to FIG. 5, a schematic depiction of this second embodiment of the LED module 40a generally includes an LED lamp 22 and a module circuit 38a. The module circuit 38a includes a controlled voltage bucking circuit 84, the sense resistor 48, and the thermal sensitive amplifying circuit 52. The voltage bucking circuit 84 is controlled because it includes feedback to adjust its output. The bucking circuit 84 output drives the LED lamp 22, and receives the sense resistor 48 feedback through the thermal sensitive amplifying circuit 52.

Referring to FIG. 5, the bucking circuit 84 is preferably a buck regulator or a bucking circuit and includes a microchip 46a, a switching MOSFET 54a, an inductor 58a, a capacitor 59a, and a diode 61a. These components are arranged in a manner commonly known to those skilled in the art to form a bucking circuit.

Figure 6:
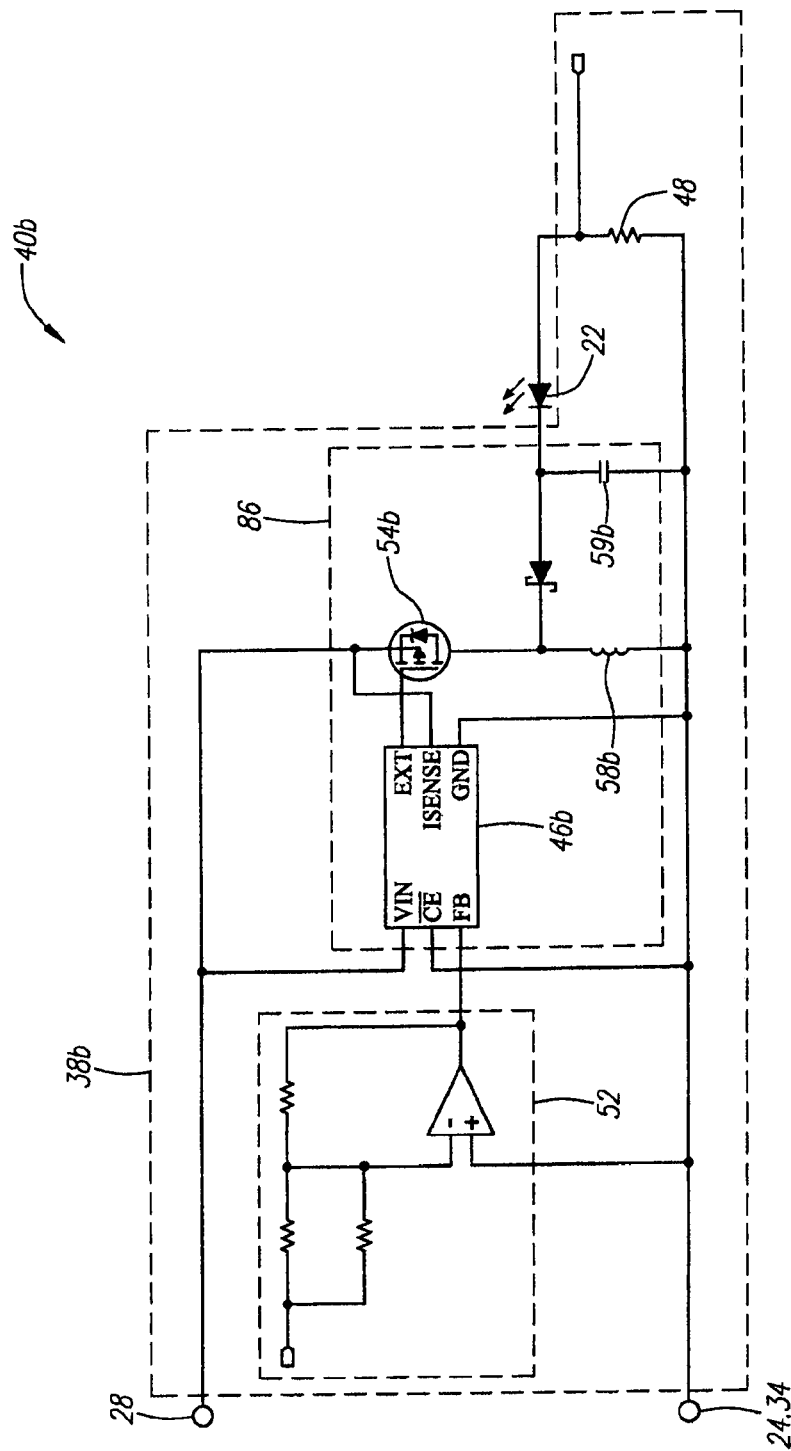
FIG. 6 is a circuit diagram of a third embodiment of a module circuit.

In a third embodiment of an LED module 40b, the power source 2 coupled to the LED module 40b may have a potential above what is needed to deliver the desired forward current during a first period of time, and a potential below what is needed during a second period of time. For example, if a flashlight is configured with three batteries arranged in series, its operating range would be 2.7 Volts to 4.5 Volts. In such an instance, the module circuit 38b preferably includes an controlled voltage inverting circuit 86 instead of the boosting circuit 44 or the bucking circuit 84. Referring to FIG. 6, a schematic depiction of a third embodiment of the LED module 40b generally includes an LED lamp 22 and a module circuit 38b. The module circuit 38b includes a controlled voltage inverting circuit 86, the sense resistor 48, and the thermal sensitive amplifying circuit 52. The inverting circuit 86 is controlled because it includes feedback to adjust its output. The inverting circuit 86 output drives the LED lamp 22, and receives the sense resistor 48 feedback through the thermal sensitive amplifying circuit 52.

Referring to FIG. 6, the inverting circuit 86 is preferably an inverting regulator or inverting circuit and includes a microchip 46*b*, a switching MOSFET 54*b*, an inductor 58*b*, a capacitor 59*b*, and a diode 61*b*. These components are arranged in a manner commonly known to those skilled in the art to form a inverting circuit.

While various embodiments of an improved LED module and its respective components have been presented in the foregoing disclosure, numerous modifications, alterations, alternate embodiments, and alternate materials may be contemplated by those skilled in the art and may be utilized in accomplishing the various aspects of the present invention. Thus, it is to be clearly understood that this description is made only by way of example and not as a limitation on the scope of the invention as claimed below.

What is claimed is:

1. A lighting module for flashlights, said lighting module comprising:
   a light emitting diode;
   an amplifying circuit including a thermistor, said thermistor arranged to sense heat from said light emitting diode; and
   a microchip having an input and an output, said amplifying circuit coupled to said input, said output coupled to a switching device that regulates energy delivered to the light emitting diode.

2. The lighting module of claim 1, wherein said switching device is part of a boosting circuit.

3. The lighting module of claim 1, wherein said switching device is part of a bucking circuit.

4. The lighting module of claim 1, wherein said switching device is part of an inverting circuit.

5. The lighting module of claim 1, wherein said switching device is a MOSFET.

6. The lighting module of claim 1, wherein said microchip is configured to operate the switching device such that 875 mA to 930 mA is delivered to the light emitting diode when said thermistor senses between 20° C. to 30° C.

7. The lighting module of claim 1, wherein said microchip is configured to operate the switching device such that 880 mA to 910 mA is delivered to the light emitting diode when said thermistor senses between 23° C. to 27° C.

8. The lighting module of claim 1, wherein said microchip is configured to operate the switching device such that substantially 900 mA is delivered to the light emitting diode when said thermistor senses 25° C.

9. The lighting module of claim 1, wherein said microchip is configured to regulate the energy that is delivered to said light emitting diode by adjusting the switching duty cycle of said switching device.

10. The lighting module of claim 1, wherein said microchip is configured to operate the switching device such that 330 mA to 450 mA is delivered to the light emitting diode when said thermistor senses between 80° C. to 100° C.

11. The lighting module of claim 1, wherein said microchip is configured to operate the switching device such that 330 mA to 370 mA is delivered to the light emitting diode when said thermistor senses between 90° C. to 100° C.

12. The lighting module of claim 1, wherein said microchip is configured to operate the switching device such that substantially 330 mA is delivered to the light emitting diode when said thermistor senses 100° C.

13. The lighting module of claim 1, wherein said microchip provides a thermally regulated signal to the LED based on the temperature sensed by the thermistor.

14. The lighting module of claim 1, wherein said microchip is a microprocessor.

15. The lighting module of claim 1, wherein said microchip is an integrated circuit.

16. The lighting module of claim 1, wherein said microchip is energized by a power source, wherein the energy of said power source depletes over time.

\* \* \* \* \*